(12) United States Patent
Grundvig et al.

(10) Patent No.: US 9,633,689 B1
(45) Date of Patent: Apr. 25, 2017

(54) CONTINUOUSLY ZONED SERVO PREAMBLE DETECTION AND FREQUENCY ACQUISITION

(71) Applicant: Avago Technologies General IP (Singapore) Pte. Ltd., Singapore (SG)

(72) Inventors: Jeffrey P. Grundvig, Longmont, CO (US); Richard Rauschmayer, Longmont, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/001,100

(22) Filed: Jan. 19, 2016

(51) Int. Cl.
 *G11B 5/596* (2006.01)
 *G11B 20/12* (2006.01)

(52) U.S. Cl.
 CPC .. *G11B 20/1217* (2013.01); *G11B 2020/1281* (2013.01)

(58) Field of Classification Search
 CPC ... G11B 27/3063; G11B 7/2403; G11B 27/34; G11B 20/1217; G11B 2220/235; G11B 220/308; G11B 2020/1238; G11B 5/59627; G11B 5/012; G11B 5/59633; G11B 5/588; G11B 5/584; G11B 15/4678

USPC .......... 360/39, 31, 77.04, 55, 51, 48, 77.06, 360/77.08, 77.14, 78.14, 25
 See application file for complete search history.

(56) References Cited

U.S. PATENT DOCUMENTS

| | | | |
|---|---|---|---|
| 7,672,071 B2 | 3/2010 | Lau | |
| 7,995,304 B2* | 8/2011 | Ozturk | G11B 5/59655 360/77.04 |
| 8,625,216 B2* | 1/2014 | Zhang | G11B 5/59688 360/39 |
| 8,654,466 B1* | 2/2014 | McFadyen | G11B 5/607 360/31 |
| 8,681,444 B2 | 3/2014 | Zhang et al. | |
| 8,824,081 B1* | 9/2014 | Guo | G11B 5/6029 360/55 |
| 8,922,926 B2* | 12/2014 | Zhang | G11B 27/3063 360/51 |

* cited by examiner

*Primary Examiner* — Nabil Hindi
(74) *Attorney, Agent, or Firm* — Sheridan Ross P.C.

(57) ABSTRACT

An apparatus for storing data includes a storage medium with user data regions and with servo data regions containing preamble patterns. Servo data in the servo data regions is written with a varying clock frequency across the storage medium. The apparatus also includes a head assembly disposed in relation to the storage medium and operable to read and write data on the storage medium. The apparatus also includes a preamble detection circuit adapted to search an input stream derived from the head assembly for the preamble patterns in a number of frequency bins.

20 Claims, 5 Drawing Sheets

CONTINUOUSLY ZONED SERVO PREAMBLE DETECTION AND FREQUENCY ACQUISITION

FIELD OF THE INVENTION

Various embodiments of the present invention provide systems, apparatuses and methods for preamble detection and frequency acquisition in a magnetic recording system with continuously zoned servo regions.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. Servo data on the storage medium is located and read to identify the position of the read/write head assembly over the storage medium.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

Various systems, apparatuses and methods for preamble detection and frequency acquisition are disclosed herein for magnetic recording systems with continuously zoned servo regions. In magnetic recording systems with continuously zoned servo regions, the frequency of servo data varies based on the location of the servo data on the storage medium, in contrast with a constant servo frequency system. However, when the position of the read/write head assembly over the medium is unknown, the exact servo data frequency is also unknown in a continuously zoned servo system, complicating initial locating and reading of the servo data.

Figure 1:
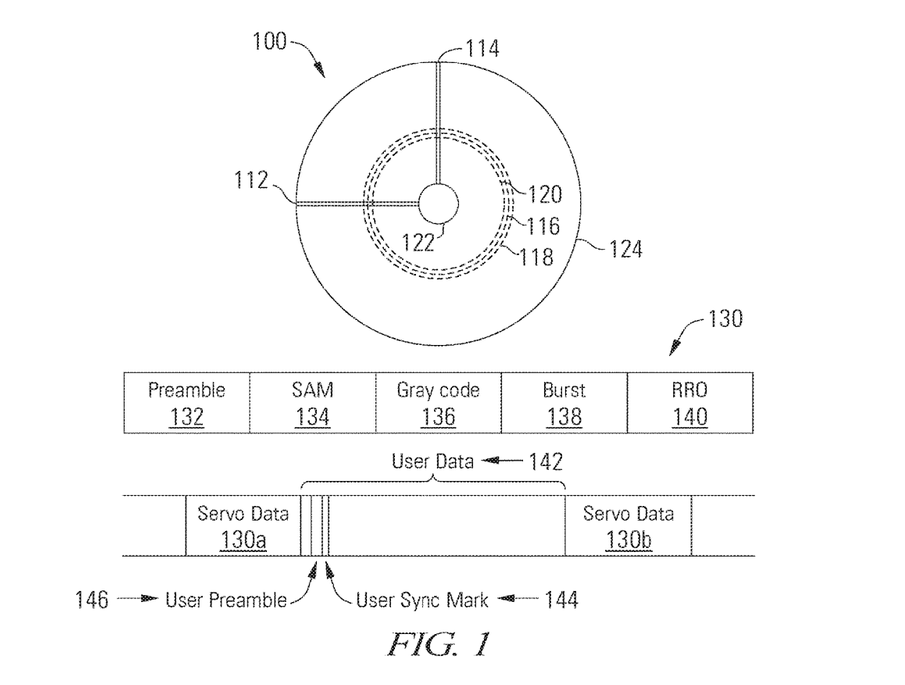
FIG. 1 is a diagram of a continuously zoned servo magnetic storage medium and sector data scheme that may be used with preamble detection and frequency acquisition in accordance with some embodiments of the present invention.

Turning to FIG. 1, a disk platter 100 in a continuously zoned servo magnetic storage system is shown with three example data tracks 116, 118, 120, indicated as dashed lines. The tracks 116, 118, 120 are segregated by servo data written within servo regions (e.g., 112, 114). It should be noted that while three data tracks 116, 118, 120 and two servo regions 112, 114 are shown, hundreds of wedges and tens of thousands of tracks may be included on a given storage medium.

The servo wedges 112, 114 include servo data 130 that is used for position control of a read/write head assembly over a desired location on disk platter 100 and for frequency synchronization in a data processing system that processes signals from the read/write head assembly. Servo data 130 is written to the disk platter 100 once during a manufacturing process in some embodiments. The servo data 130 generally includes a preamble pattern 132 followed by a servo address mark 134, a Gray code 136, a burst demodulation field 138, and a repeatable run-out (RRO) field 140. It should be noted that different information can be included in the servo fields. The preamble pattern 132 can be any suitable pattern, such as, but not limited to, a repeating pattern (e.g., 00110011) that is written to the disk platter 100 essentially as a square wave but which is filtered during read operations to approximate a sine wave. The preamble pattern 132 can be detected, for example, by monitoring the energy of the readback signal for energy at the frequencies of the preamble pattern. The preamble pattern 132 can be used to mark the beginning of other servo fields, as well as for automatic gain control or any other suitable purposes. The servo address mark 134 marks the beginning of the Gray code 136, which contains track number and/or other information that provides coarse positioning information for the read/write head assembly. The burst demodulation field 138 generally provides finer positioning information for the read/write head assembly. The repeatable run-out field 140 provides positioning information to cause the read/write head assembly to follow a non-circular path around the storage medium, for example to compensate for platter shift.

Between the servo data regions 130a and 130b, a user data region 142 is provided. User data region 142 can include one or more sets of data that are stored on disk platter 100. The data sets can include user synchronization information or syncmarks, identifying the location of user data fragments within the user data region 142. A number of user data fragments combine to form a data sector.

In operation, disk platter 100 is rotated in relation to a sensor that senses information from the storage medium. In a read operation, the sensor would sense servo data from servo region 112 (i.e., during a servo data period) followed by user data from a user data region between servo region 112 and servo region 114 (i.e., during a user data period) and then servo data from servo region 114. In a write operation, the sensor would sense servo data from servo region 112 then write data to the user data region between servo region 112 and servo region 114, with location information in the user data region provided by a user syncmark 144 and a user preamble 146.

In some embodiments, disk platter 100 ideally always spins at same rate. In a continuously zoned servo system, the clock frequency at which servo data is written to and read from the disk platter 100 is varied as a function of the distance from the inner diameter of the disk platter 100. For example, the servo data frequency can be higher near the outer diameter than it is near the inner diameter of the disk platter 100, so that the space used for servo data is uniform across the disk platter 100 despite the constant spin rate, or closer to uniform than in magnetic recording systems with constant servo frequency. By increasing the servo frequency as the distance from the inner diameter of the disk platter 100 increases, preventing or reducing expansion in the size of the servo regions, more media is available to store user data. In some embodiments, the continuously zoned servo system has a constant density servo pattern across the read/write head assembly stroke, regardless of position between the inner and outer diameters of the disk platter 100.

The position of the read/write head assembly over the disk platter 100 may not be precisely known at times, for example on spin up or when coming off crash stop. As a result, the frequency of the servo preamble pattern may not be precisely known, making it difficult to detect the preamble pattern or making detection and decoding of the Gray code 136 and servo address mark 134 unreliable. In some embodiments, the servo frequency is obtained from a lookup table based on the track number, which is read from the Gray code 136, requiring reliable decoding of the Gray code 136. The preamble detection and frequency acquisition disclosed herein enables a read channel to detect the preamble in the servo region in the presence of possible servo frequency offsets and to automatically adjust the servo frequency to enable proper SAM/Gray detection.

Figure 2:
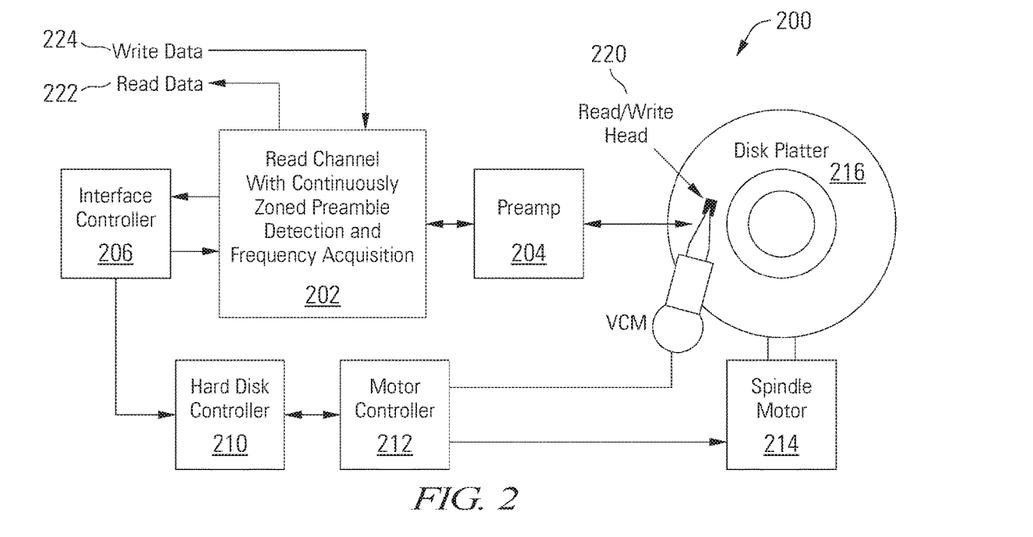
FIG. 2 depicts a storage system including a read channel with continuously zoned servo preamble detection and frequency acquisition in accordance with some embodiments of the present invention.

Turning to FIG. 2, a storage system 200 is disclosed which includes a read channel circuit 202 incorporating continuously zoned servo preamble detection and frequency acquisition in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. Disk platter 216 includes magnetic signals recorded in accordance with either a longitudinal or a perpendicular recording scheme.

In a typical read operation, read/write head assembly 220 is positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 digitizes and decodes the received analog signal, processing servo data to position the read/write head assembly 220 and processing user data to recreate information written to disk platter 216. This user data is provided as read data 222 to a receiving circuit. A write operation is substantially the opposite of the preceding read operation with write data 224 being provided to read channel circuit 202. This data is then encoded and written to disk platter 216. In the course of processing servo data in the read channel circuit 202, preamble detection and frequency acquisition is performed, including applying servo frequency offsets to detect the servo preamble and to determine the amount of frequency offset between the applied servo clock frequency and the actual servo clock frequency for the servo data being read.

Figure 3:
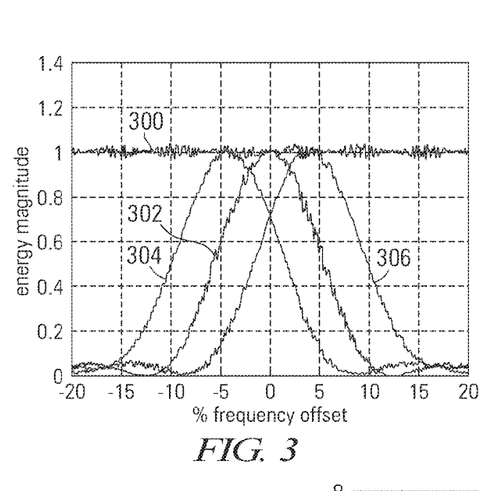
FIG. 3 is a plot showing in-band energy for a preamble signal at an expected servo frequency and at positive and negative frequency offsets in accordance with some embodiments of the present invention.

Turning to FIG. 3, energy magnitudes are depicted as a function of percentage of frequency offset from an expected servo frequency in accordance with some embodiments of the present invention. The expected servo frequency is selected based on the estimated position of the read/write head assembly. For example, at spin up of the disk platter to begin a read or write operation in a magnetic storage system, the track number of the data track the read/write head assembly is expected to be positioned over at spin up is used to read the servo clock frequency from a lookup table. This servo clock frequency is initially used when searching for the frequency tone of the preamble and when sampling and processing servo fields.

In some embodiments, the total energy of the readback signal from the read head is integrated over all frequencies in the servo processing circuits to yield an out-of-band energy measurement which can be used along with in-band energy measurements to detect the preamble. In some other embodiments, preamble detection is not based on out-of-band energy measurements.

The total energy magnitude 300 is plotted in FIG. 3 as a function of percentage of frequency offset from the expected servo frequency. Notably, the total energy magnitude 300 remains roughly constant across the frequency offset range for the preamble portion of the servo field. This is because the sample stream derived from the read head as it passes over a data track includes user data and servo fields not limited to the servo preamble, which appears as pseudo-random bit patterns. While the data recorded to the disk platter can be encoded to reduce the effects of noise, for example limiting the maximum length of same-valued bit runs and limiting the number of consecutive bit transitions in the data, thereby constraining the overall frequency content somewhat, the readback signal for the entire data track still contains frequency content over a much wider range than the servo preamble.

The in-band energy magnitudes 302, 304, 306 for three different frequency bins are also plotted in FIG. 3 as a function of percentage of frequency offset from the expected servo frequency. The preamble detection circuit searches for the preamble in multiple frequency bins. One frequency bin corresponding to in-band energy magnitude line 302 is set at the expected servo frequency. Another frequency bin corresponding to in-band energy magnitude line 304 is set at the expected servo frequency with about a negative five percent frequency offset. Another frequency bin corresponding to in-band energy magnitude line 306 is set at the expected servo frequency with about a positive five percent frequency offset. The preamble detection and frequency acquisition is not limited to these example frequency offset values or to any particular number of frequency bins.

Preamble detection filters configured for the frequency bins 302, 304, 306 filter the sample stream derived from the read head. When reading a servo preamble having a servo clock frequency that matches the expected servo frequency, the in-band energy magnitude 304 from the frequency bin with the negative offset and the in-band energy magnitude 306 from the frequency bin with the positive offset will both be at about 70% of the in-band energy magnitude 302 from the frequency bin at the expected servo frequency with no offset. When reading a servo preamble having a servo clock frequency with a negative offset of about five percent with respect to the expected servo frequency, the in-band energy magnitude 302 from the frequency bin at the expected servo frequency with no offset will be about 60% of the in-band energy magnitude 304 from the frequency bin with the negative offset, and the in-band energy magnitude 306 from the frequency bin with the positive offset will be at about 17% of the in-band energy magnitude 304 from the frequency bin with the negative offset.

Preamble detection can be performed based on the output of the preamble detection filters in each of the frequency bins. The in-band preamble detection bins run in parallel in some embodiments. At each clock edge only the largest amplitude in-band result from the frequency bins is selected and is used for the preamble detection decision. The coefficients used for the side lobe frequency bins are quantized in some embodiments to 1, 0, −1. A phase accumulator can be used to generate the side lobe coefficients at a predetermined frequency offset. In some other embodiments, coefficients for the side lobe frequency bins are hard wired or hard coded in the preamble detection circuit.

In some cases the magnitude of the largest amplitude in-band result is used to determine whether the preamble has been detected, for example comparing the magnitude of the largest amplitude in-band result with a threshold. In some other cases, the magnitude of the largest amplitude in-band energy is compared with the out-of-band energy magnitude to determine whether the preamble has been detected.

Figure 4:
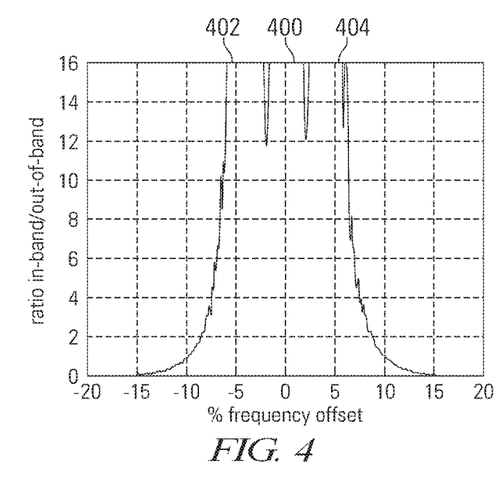
FIG. 4 is a plot showing a ratio of in-band energy to out-of-band energy versus servo frequency offset in accordance with some embodiments of the present invention.

The ratio between the largest in-band energy from the in-band detection bins and the out of band energy is plotted as a function of percentage frequency offset from the servo clock frequency in FIG. 4. By selecting the in-band energy calculated by the preamble detection bin with the largest amplitude output, the preamble can be reliably detected over a wider frequency range. With three frequency bins spaced at about 5% frequency offsets, the ratio of in-band to out-of-band energy used to detect the preamble in some embodiments will have three peaks 400, 402, 404 as depicted in FIG. 4, corresponding to frequency bins at the expected servo frequency and at negative five percent and positive five percent offsets, respectively. Notably, even at frequency offsets between the frequency bins (e.g., at about a negative 2.5% frequency offset) the ratio between in-band and out-of-band energy is about 12:1, enabling reliable detection of the preamble. The spacing between the frequency bins and the number of frequency bins are thus selected to provide an overlap that enables reliable detection of the preamble at any offsets between the actual servo frequency at the location of the read/write head assembly and the expected servo frequency.

Figure 5:
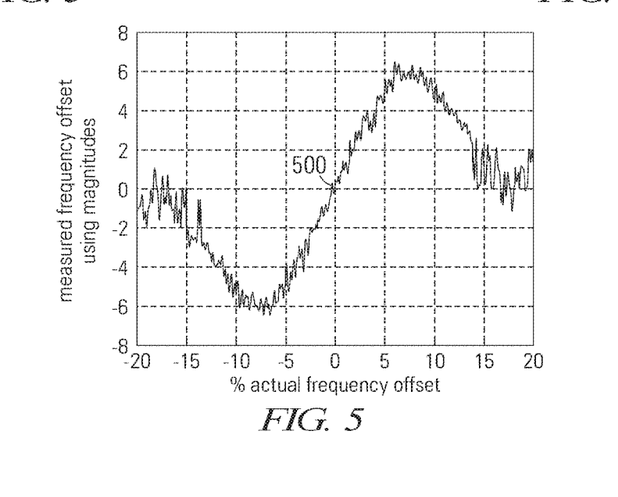
FIG. 5 is a plot showing servo frequency offset measured using energy magnitudes, plotted as a function of the percentage of actual frequency offset.

Turning to FIG. 5, the servo frequency offset 500 measured using energy magnitudes is plotted as a function of the percentage of actual frequency offset in accordance with some embodiments of the invention, illustrating the performance of the example preamble detection system with three frequency bins having about five percent frequency offsets. For the expected plus and minus five percent range in the example three bin system the frequency offset can be reliably determined, and even up to about plus and minus ten percent the direction of the frequency offset can be determined. Again, the spacing between frequency bins and the number of frequency bins can be adjusted as desired based on the possible frequency offset, i.e., the range of servo clock frequencies from the inner diameter of the disk platter to the outer diameter of the disk platter for a particular magnetic storage system.

The preamble detection can be performed using multiple frequency bins in any suitable manner, such as, but not limited to, based on the in-band energy magnitude from the frequency bin with the largest amplitude output, or based on the ratio of the in-band energy magnitude from the frequency bin with the largest amplitude output to the energy magnitude of the out-of-band energy. Based upon the disclosure provided herein, one of ordinary skill in the art will recognize a variety of techniques and circuits that can be used for preamble detection using multiple frequency bins in relation to different embodiments of the present invention.

Multiple frequency bins are also used for frequency acquisition in some embodiments as well as for preamble detection. In some cases, the offset between the actual servo frequency at the location of the read/write head assembly and the expected servo frequency is determined using a phase-based frequency offset calculation. In some other cases, the offset between the actual servo frequency at the location of the read/write head assembly and the expected servo frequency is determined using a magnitude-based frequency offset calculation. This allows the servo clock frequency to be corrected to match the actual frequency of the servo data on the disk platter at the location of the read/write head assembly so that servo fields such as the servo address mark pattern 134 and Gray code 136 can be reliably retrieved.

In a phase-based frequency offset calculation, once a preamble detect signal is asserted indicating that the preamble has been detected, the phase of the preamble is captured at the beginning and end of the preamble detect active period. In other words, the phase is captured at points as close as possible to the beginning and end of the preamble. A phase difference is calculated between the phase measurements captured at the beginning and end of the preamble detect active period. The length of the preamble detect period is divided into the phase difference to yield the frequency offset. This measures the change in the phase from the beginning to the end of the preamble. For example, given a preamble of length 100T, where T is the fundamental bit period, if the phase drifts by IT from the beginning to the end of the 100T preamble sequence, there would be a 1% frequency error.

In a magnitude-based frequency offset calculation, the relative magnitudes in the output of the in-phase energy frequency bins are compared and a lookup table or other calculation or approximation is used to determine the frequency offset. For example, referring to FIG. 3, if the actual servo clock frequency were off by +5%, the in-band energy magnitude 306 from the frequency bin with the positive five percent offset would be near its maximum, the in-band energy magnitude 302 would be down to about 60% of its maximum, and the in-band energy magnitude 304 would be down to about 10% of its maximum. These three values are used in some embodiments as index values to a lookup table to retrieve the servo clock frequency offset of +5%. The magnitude-based frequency offset calculation does not require that the entire preamble field be read, preventing inaccuracy when the preamble is not immediately detected at the beginning of the preamble field and having less latency than the phase-based frequency offset calculation. The magnitude-based frequency offset calculation requires only one measurement at one point in time. If the preamble is longer the measurement can be further refined by averaging two or more readings. The magnitude-based frequency offset calculation does not require an additional arctan computation used in some embodiments of the phase based frequency offset calculation, and avoids complications of switching between frequency bins having the largest amplitude output.

In some embodiments, the magnitude-based frequency offset calculation is performed as follows:

If Middle Lobe is largest magnitude

Frequency offset=scalar*((left_mag-middle_mag)+ (middle_mag-right_mag))

If Right Lobe is largest magnitude

Frequency offset=scalar*(right_mag-middle_mag)+ offset1

If Left Lobe is largest magnitude

Frequency offset=scalar*(middle_mag-left_mag)- offset1

The magnitudes of the in-band energy for each frequency bin, referred to above as the middle lobe, left lobe and right lobe, are compared to identify the largest energy magnitude. The frequency offset (measured_foff) is calculated according to the equations above, where the scalar is the same for all equations and is based on the relationship between the in-band energy magnitudes for the frequency bins at various offsets, and where the offset1 value is based on the spacing between the frequency bins. In some embodiments, a linearity adjustment is performed when the frequency offset magnitude is greater than 2% as follows:

Adj_mag=abs(measured_foff)−2

New frequency offset=measured_foff+ adj_mag*sign_of_foff

Figure 6:
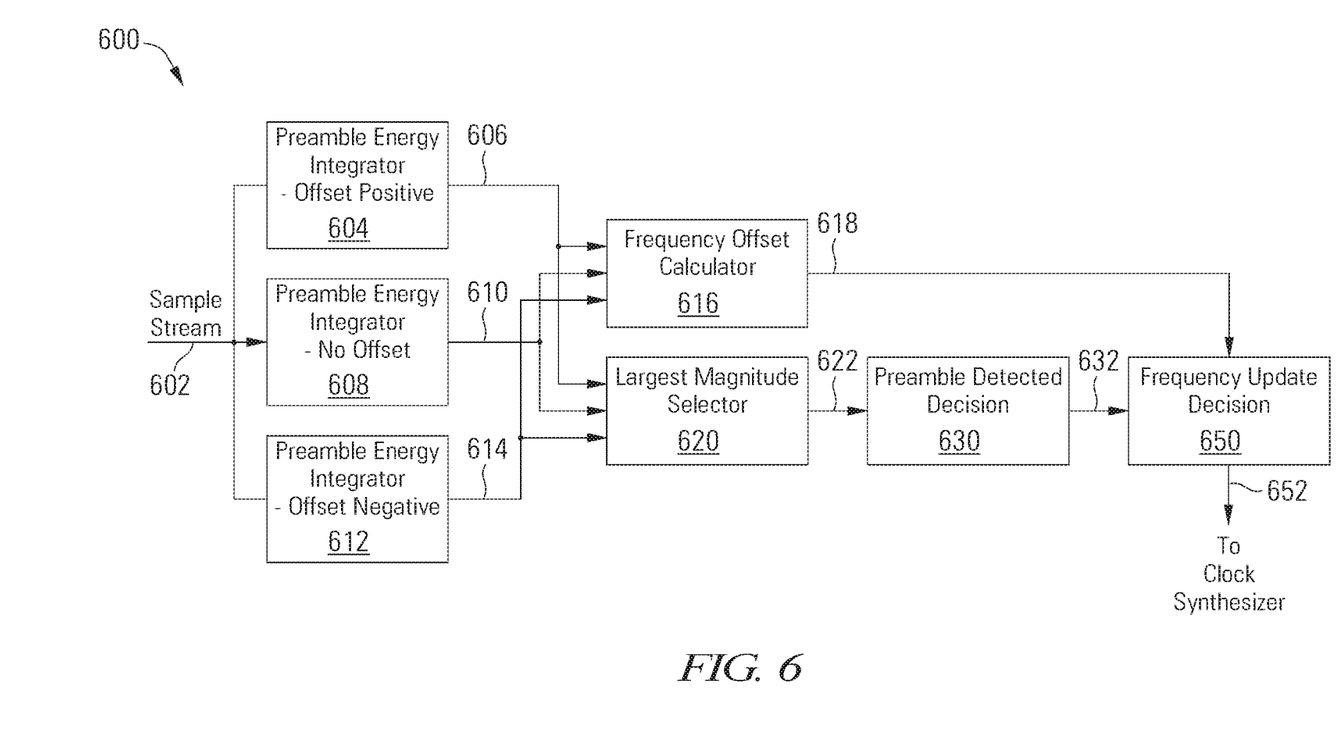
FIG. 6 depicts a continuously zoned servo preamble detection and frequency acquisition circuit in accordance with some embodiments of the present invention.

Turning to FIG. 6, a continuously zoned servo preamble detection and frequency acquisition circuit 600 is depicted in accordance with some embodiments of the present invention. A sample stream 602 is processed in preamble energy integrators 604, 608, 612 which calculate the in-band energy 606, 610, 614 at a positive offset from the expected servo frequency, at the expected servo frequency, and at a negative offset from the expected servo frequency, respectively. The in-band energy 606, 610, 614 can be calculated based on the sample stream 602 in any suitable manner. In some embodiments, the preamble energy integrators 604, 608, 612 calculate the in-band energy by generating a cosine and sine wave signal at the expected servo frequency or their offset versions, multiplying each by the sample stream 602 to generate integrated cosine and sine values, squaring the integrated cosine and sine values, and summing the resulting squared integrated cosine and sine values to yield the in-band energy result 606, 610 or 614. For example, the middle lobe preamble energy integrator 608 generates the internal cosine and sine wave signal at the expected servo frequency. The right lobe preamble energy integrator 604 generates the internal cosine and sine wave signal at the positive offset from the expected servo frequency, e.g., at about a five percent positive offset from the expected servo frequency. The left lobe preamble energy integrator 612 generates the internal cosine and sine wave signal at the negative offset from the expected servo frequency, e.g., at about a five percent negative offset from the expected servo frequency.

A largest magnitude selection circuit 620 selects the in-band energy result 606, 610 or 614 with the largest amplitude as the selected in-band energy result 622. A preamble detected decision circuit 630 determines when the preamble has been detected, based at least in part on the largest amplitude in-band energy result 622. For example, in some embodiments, the preamble detected decision circuit 630 compares the largest amplitude in-band energy result 622 with a threshold to determine whether the preamble has been identified in the sample stream 602. The preamble detected decision circuit 630 asserts a preamble detect signal 632 while the preamble pattern appears in the sample stream 602.

A frequency offset calculator 616 performs the frequency acquisition based on the in-band energy results 606, 610, 614, for example calculating the frequency offset 618 using the phase-based frequency offset calculation or the magnitude-based frequency offset calculation disclosed above.

A frequency update decision circuit 650 provides a servo clock frequency update signal 652 based on the frequency offset 618 when the preamble detect signal 632 is asserted. In some embodiments, the frequency update decision circuit 650 can be as simple as a gate controlled by the preamble detect signal 632 to pass the frequency offset 618 when the preamble is detected. In some other embodiments, the frequency update decision circuit 650 can be adapted to improve the reliability of the frequency acquisition, for example applying a gain term to the frequency offset 618. The servo clock frequency update signal 652 can be used in any suitable manner, such as by the clock synthesizer to adjust the servo clock frequency used to detect the preamble and to sample and decode other servo fields. The clock synthesizer can, for example, change the clock frequency based on the current clock frequency and the offset identified by the servo clock frequency update signal 652 when the preamble is detected. The servo clock frequency can then be updated normally as the read head is moved, for example using a lookup table to retrieve the servo clock frequency based on the track number in the Gray code 136. If the position of the read head ever becomes unknown again, for example upon spin up to begin a new operation, the preamble detection and frequency acquisition circuit 600 may again calculate a non-zero frequency offset 618 if the actual head location differs from the expected location.

The sample stream 602 can be derived from an analog signal from the read/write head in any suitable manner. In some embodiments, the analog signal is amplified and filtered in a preamplifier to yield an amplified analog signal. The amplified analog signal can be further processed by, for example, a variable gain amplifier to correct amplitude errors, baseline wander digital to analog converter to correct baseline bias errors, magneto-resistive (MR) asymmetry correction circuit, low-pass filter to remove signal content above that desired in the servo signal, etc. The resulting processed analog signal can be sampled by an analog to digital converter to yield digital samples to be used as the sample stream 602, with or without further processing. Based upon the disclosure provided herein, one of ordinary skill in the art will recognize a variety of circuits that can be used to provide the sample stream 602 in relation to different embodiments of the present invention.

Figure 7:
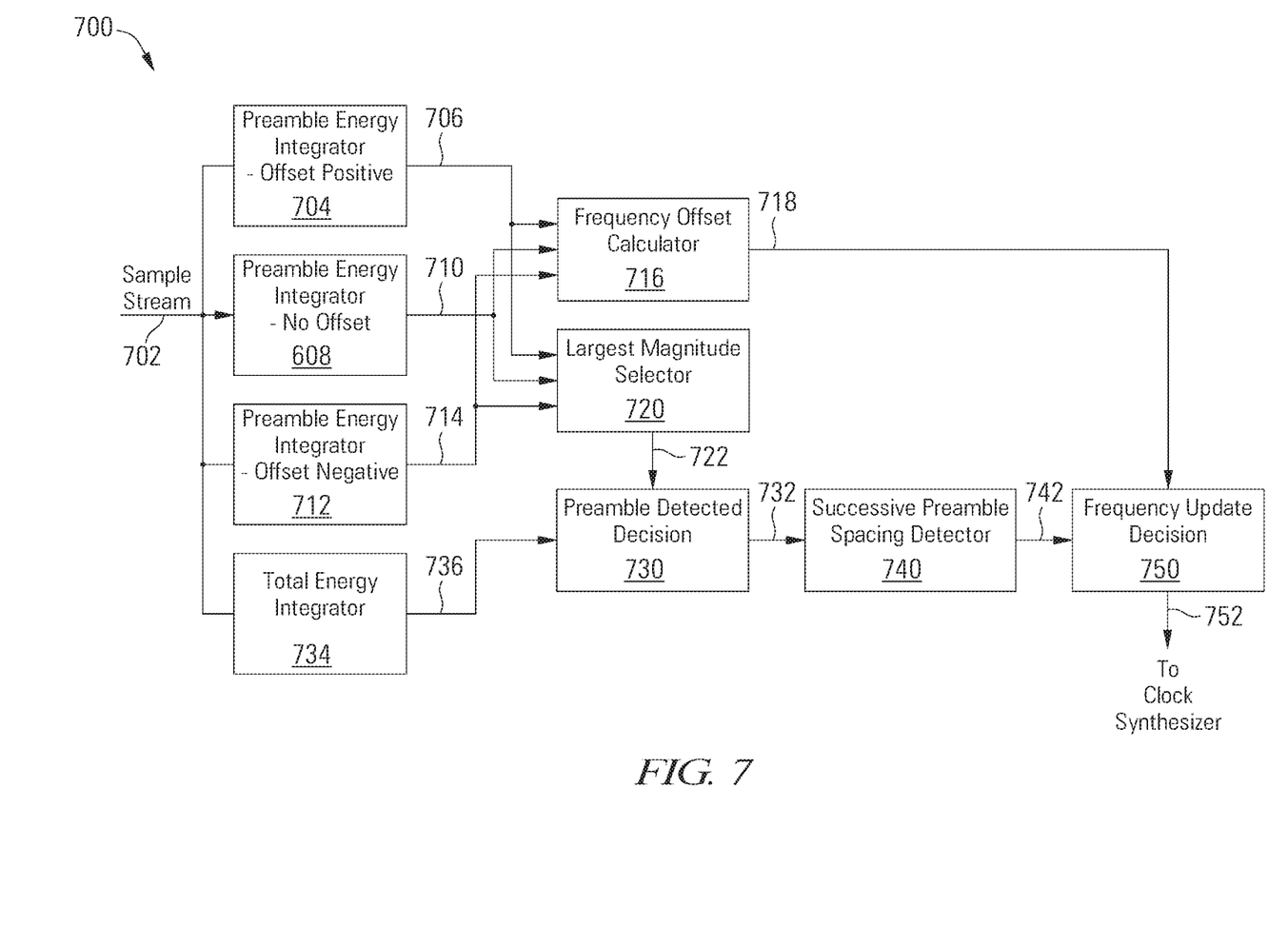
FIG. 7 depicts a continuously zoned servo preamble detection and frequency acquisition circuit with total energy integrator for preamble detection and with preamble false positive detection prevention based on successive preamble spacing monitoring in accordance with some embodiments of the present invention.

Turning to FIG. 7, a continuously zoned servo preamble detection and frequency acquisition circuit 700 with total energy integrator 734 for preamble detection and with preamble false positive detection prevention based on successive preamble spacing monitoring is depicted in accordance with some embodiments of the present invention. A sample stream 702 is processed in preamble energy integrators 704, 708, 712 which calculate the in-band energy 706, 710, 714 at a positive offset from the expected servo frequency, at the expected servo frequency, and at a negative offset from the expected servo frequency, respectively. The total energy integrator 734 calculates the total energy across all frequencies in the sample stream 702, yielding a total energy 736.

A largest magnitude selection circuit 720 selects the in-band energy result 706, 710 or 714 with the largest amplitude as the selected in-band energy result 722. A preamble detected decision circuit 730 determines when the preamble has been detected, based on the largest amplitude in-band energy result 722 and on the total energy 736. In some embodiments, the preamble detected decision circuit 730 subtracts the selected in-band energy result 722 with the largest amplitude from the total energy 736 to calculate the out-of-band energy. The preamble detected decision circuit 730 calculates the ratio of in-band energy to out-of-band energy as shown in FIG. 4, and compares the ratio with a threshold. While the ratio of in-band energy to out-of-band energy is above a threshold, the preamble detected decision circuit 730 asserts the preamble detect signal 732.

By adding the side lobes with the multiple frequency bins to detect the servo preamble and acquire the servo frequency, the capture range of the preamble detection filter is effectively widened. This potentially allows more noise to get into the system, which can make the system less tolerant to random noise, increasing the likelihood of false positives for preamble detection as compared to a single energy bin detector. Furthermore, the frequency acquisition by which the servo clock frequency is changed can increase the negative impact of false positives in preamble detection. In storage systems with a constant servo frequency, if non-preamble data triggers a false positive preamble detection, the result is that servo fields do not exist following the false preamble pattern, and the system will continue to search for the next preamble pattern. However, if the expected servo frequency is adjusted based on a false positive preamble detection, it could reduce the ability of the system to detect the preamble pattern at the actual servo frequency.

In some embodiments, the risk of false positive preamble detection is reduced by a successive preamble spacing detector 740, which asserts a preamble detection signal 742 only when the preamble detected decision circuit 730 has detected multiple preamble patterns at correct intervals in the sample stream 702. Because the spacing between servo regions on the disk platter is designed into the system and is known a priori, the successive preamble spacing detector 740 can ensure that the preamble pattern is detected at least twice in succession at the proper interval. Even if the preamble detected decision circuit 730 misidentifies a portion of the sample stream 702 as a preamble, it is extremely unlikely that it will misidentify another portion of the sample stream 702 as a preamble at the proper preamble spacing distance from the first misidentified location.

A frequency offset calculator 716 performs the frequency acquisition based on the in-band energy results 706, 710, 714, for example calculating the frequency offset 718 using the phase-based frequency offset calculation or the magnitude-based frequency offset calculation disclosed above. A frequency update decision circuit 750 provides a servo clock frequency update signal 752 based on the frequency offset 718 when the preamble detect signal 732 is asserted.

In some embodiments, the impact of false positive preamble detection on frequency acquisition is also reduced by applying an update gain that is less than one to the calculated frequency offset. Such an update gain can be applied at any suitable location, such as, but not limited to, in frequency offset calculator 716 or in frequency update decision circuit 750. For example, if the frequency offset calculator 716 determines that the expected servo frequency is offset from the actual servo frequency by 2%, an update gain of 0.5 applied to the frequency offset would cause a servo frequency update of 1%. The residual frequency error may be corrected normally based on the track number read in the Gray code 136 if it can be successfully decoded, by looking up the actual servo frequency in the lookup table based on the track number. If the Gray code 136 cannot be successfully decoded, as would be the case in the event of a false positive preamble detection or if the expected servo frequency is too different from the actual servo frequency, the next preamble detection will be able to apply another correction to the servo frequency. As a result, if the frequency offset is applied as a result of a false positive preamble detection, the impact of the false positive will be reduced.

Figure 8:
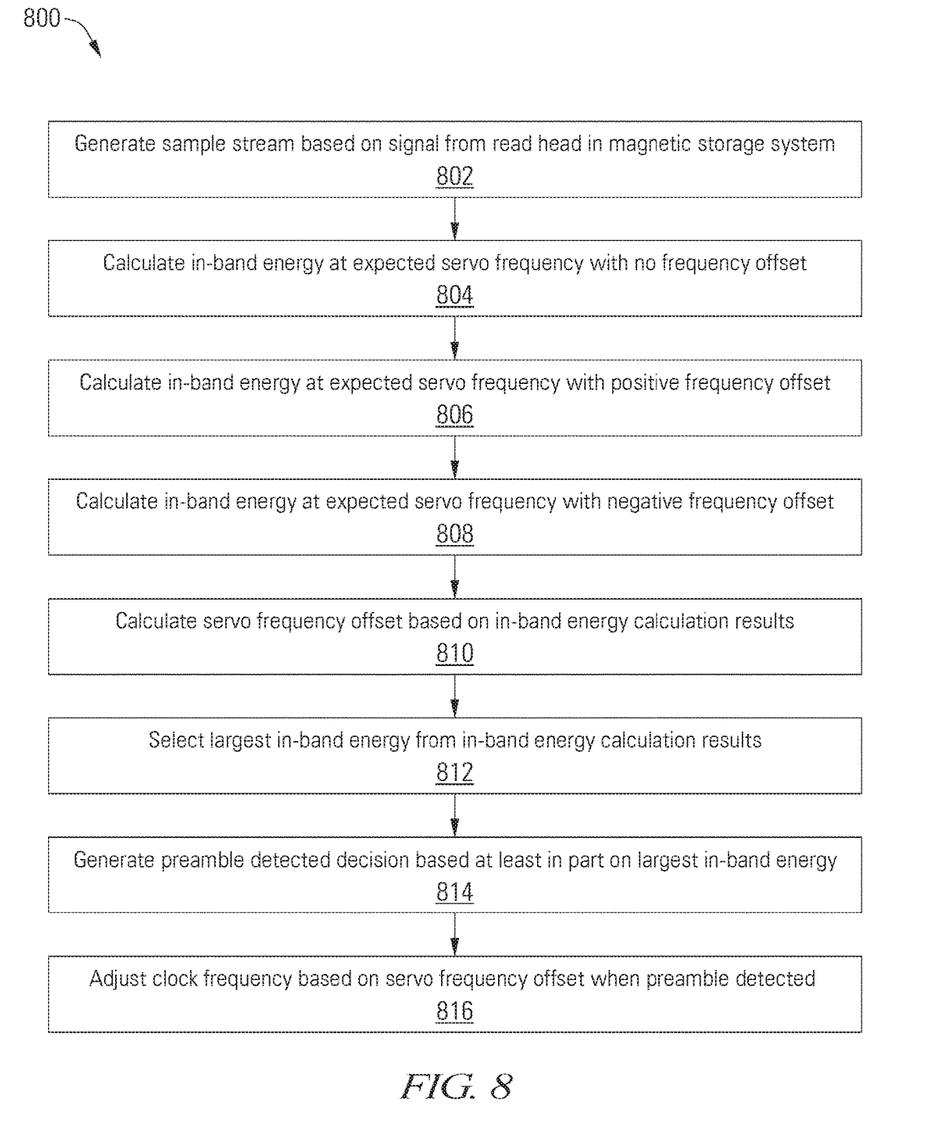
FIG. 8 is a flow diagram depicting an operation of preamble detection and frequency acquisition in a continuously zoned servo magnetic storage system in accordance with some embodiments of the present invention.

Turning to FIG. 8, a flow chart 800 illustrates a method for preamble detection and frequency acquisition in a continuously zoned servo magnetic storage system in accordance with some embodiments of the invention. Following flow chart 800, a sample stream is generated based on the signal from a read head in a continuously zoned servo magnetic storage system. (Block 802) The sample stream can be generated in any suitable manner based on the analog signal from the read head, including for example amplifying the analog signal, applying variable gain control, DC bias correction, filtering, etc., as well as sampling to yield digital samples. The in-band energy is calculated at the expected servo frequency with no frequency offset. (Block 804) The expected servo frequency is based upon the estimated position, i.e., track number, of the read head over the disk platter. The in-band energy refers to the energy of the sample stream within the frequency range of the expected servo frequency. The in-band energy can be calculated in any suitable manner. In some embodiments, the in-band energy is calculated by generating a cosine and sine wave signal at the expected servo frequency, multiplying each by the sample stream to generate integrated cosine and sine values, squaring the integrated cosine and sine values, and summing the resulting squared integrated cosine and sine values to yield the in-band energy result. Based upon the disclosure provided herein, one of ordinary skill in the art will recognize a variety of techniques that can be used to calculate the in-band energy in relation to different embodiments of the present invention.

The in-band energy is calculated at the expected servo frequency with a positive frequency offset. (Block 806) The in-band energy is calculated at the expected servo frequency with a negative frequency offset. (Block 808) Any suitable positive and negative frequency offsets can be selected that enables the preamble to be detected reliably based on one of the in-band energy calculation results. Additional in-band energy calculations can be performed at other frequency offsets if desired to widen the servo frequency range within which the preamble is sought, although this can increase the risk of false positives.

The servo frequency offset is calculated based on the in-band energy calculation results. (Block 810) The servo frequency offset can be calculated in any suitable manner. For example, in some embodiments, the servo frequency offset is calculated by determining the phase drift from the beginning to the end of the preamble. For example, given a preamble of length 100T, where T is the fundamental bit period, if the phase drifts by 1T from the beginning to the end of the 100T preamble sequence, there would be a 1% frequency error. In another approach, a magnitude-based frequency offset calculation is performed, comparing the relative magnitude of each of the in-band energy calculation results. The latter approach does not require that the entire preamble field be read, preventing inaccuracy when the preamble is not immediately detected at the beginning of the preamble field and having less latency. Based upon the disclosure provided herein, one of ordinary skill in the art will recognize a variety of techniques and circuits that can be used to calculate the servo frequency offset based on the in-band energy calculation results in relation to different embodiments of the present invention.

The largest in-band energy is selected from the in-band energy calculation results. (Block 812) A decision as to whether the preamble is detected is generated based at least in part on largest in-band energy. (Block 814) The preamble detection can be performed in any suitable manner, for example determining whether the magnitude of the largest in-band energy is above a threshold, or based on the ratio of the largest in-band energy to the out-of-band energy. Based upon the disclosure provided herein, one of ordinary skill in the art will recognize a variety of techniques and circuits that can be used to determine when the preamble has been detected in relation to different embodiments of the present invention. In some embodiments, the likelihood of false positives is reduced by, for example, requiring that two or more preambles are detected at the correct intervals based on the servo region spacing on the disk platter before accepting that the preamble has been found. The servo clock frequency is adjusted based on the servo frequency offset when the preamble is detected. (Block 816) In some embodiments, the impact of false positives in the preamble detection is reduced by applying a gain factor to the calculated servo frequency offset, so that the servo clock frequency is not corrected by the full amount of the calculated servo frequency offset with a single detected preamble field. In this manner, if the samples identified as a preamble are not actually a preamble field, the servo frequency offset calculated based on those samples will not move the servo clock frequency so far as to prevent subsequent detection of the next actual preamble field. Notably, the steps in the method of FIG. 8 are not limited to performance in the depicted order, and one or more of the steps can be performed in parallel.

The preamble detection and frequency acquisition disclosed herein enable read head position calculation in a continuously zoned servo magnetic storage system, even when the actual read head position and the corresponding servo clock frequency are not exactly known.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

The various blocks discussed above and shown in the Figures may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some cases, parts of a given system, block or circuit may be implemented in software or firmware, while other parts are implemented in hardware.

In conclusion, the present invention provides systems, apparatuses and methods for preamble detection and frequency acquisition in a continuously zoned servo magnetic storage system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for storing data, comprising:
a storage medium comprising servo data regions and user data regions, the servo data regions comprising a preamble pattern, wherein servo data in the servo data regions is written with a varying clock frequency across the storage medium;
a head assembly disposed in relation to the storage medium and operable to read and write data on the storage medium; and
a preamble detection circuit configured to search for the preamble pattern in a plurality of frequency bins of an input stream derived from the head assembly.

2. The apparatus of claim 1, wherein the servo data regions have a constant density across the storage medium.

3. An apparatus for storing data, comprising:
a storage medium comprising servo data regions and user data regions, the servo data regions comprising a preamble pattern, wherein servo data in the servo data regions is written with a varying clock frequency across the storage medium;
a head assembly disposed in relation to the storage medium and operable to read and write data on the storage medium; and
a preamble detection circuit configured to search for the preamble pattern in a plurality of frequency bins of an input stream derived from the head assembly, wherein the preamble detection circuit comprises a plurality of preamble energy integrators configured to calculate an in-band energy in each of the plurality of frequency bins.

4. The apparatus of claim 3, wherein the preamble detection circuit comprises an in-band energy selector configured to select an output of one of the plurality of preamble energy integrators having a largest amplitude as a largest in-band energy.

5. The apparatus of claim 4, wherein the preamble detection circuit is configured to detect the preamble pattern based at least in part on said largest in-band energy.

6. The apparatus of claim 5, wherein the preamble detection circuit is configured to detect the preamble pattern based on a ratio between the largest in-band energy and the out-of-band energy.

7. The apparatus of claim 3, further comprising a frequency offset calculator configured to calculate a frequency offset between an expected servo frequency and an actual servo frequency.

8. The apparatus of claim 7, wherein the frequency offset calculator is configured to calculate the frequency offset based on a phase difference at a beginning of a preamble detection and at an end of the preamble detection.

9. The apparatus of claim 7, wherein the frequency offset calculator is configured to calculate the frequency offset based on a magnitude of an output of each of the plurality of preamble energy integrators.

10. The apparatus of claim 9, wherein the frequency offset calculator comprises a lookup table storing frequency offset values, indexed with the magnitude of the output of each of the plurality of preamble energy integrators as a combined index.

11. The apparatus of claim 7, wherein the frequency offset calculator is configured to apply an update gain to the frequency offset.

12. The apparatus of claim 7, further comprising a frequency update decision circuit configured to output the frequency offset to a clock synthesizer while the preamble detection circuit detects the preamble in the input stream.

13. The apparatus of claim 7, further comprising a successive preamble spacing detector configured to detect when the preamble pattern has been detected at least twice in succession at an expected interval before indicating that the preamble has been detected.

14. A method for preamble detection and frequency acquisition in a continuously zoned servo magnetic storage system, comprising:
generating a sample stream from a read head in the magnetic storage system;
calculating a first in-band energy of the sample stream at an expected servo frequency;
calculating a second in-band energy of the sample stream at a negative offset from the expected servo frequency;
calculating a third in-band energy of the sample stream at a positive offset from the expected servo frequency;
selecting the first in-band energy, the second-in-band energy or the third in-band energy having a largest amplitude as the largest in-band energy; and
detecting a preamble pattern in the sample stream based at least in part on the largest in-band energy.

15. The method of claim 14, further comprising calculating a frequency offset based on the first in-band energy, the second-in-band energy and the third in-band energy.

16. The method of claim 15, wherein calculating the frequency offset comprises calculating a phase difference between a beginning of the preamble pattern and an end of the preamble pattern.

17. The method of claim 15, wherein calculating the frequency offset comprises deriving the frequency offset based on a relative magnitude of the first in-band energy, the second-in-band energy and the third in-band energy.

18. The method of claim 14, further comprising adjusting a clock frequency based on the frequency offset when the preamble pattern is detected.

19. The method of claim 14, further comprising determining that the preamble pattern has been detected at least twice in succession at an expected interval between instances of the preamble pattern.

20. A storage device, comprising:
a storage medium;
a head assembly disposed in relation to the storage medium;
means for detecting a preamble pattern in a sample stream derived from the head assembly using a plurality of frequency bins; and
means for calculating a frequency offset between an expected servo frequency and an actual servo frequency based on in-band energy values calculated in each of the plurality of frequency bins.

* * * * *